J. LENTZ.
GRASS EDGING TOOL.
APPLICATION FILED AUG. 23, 1917.
1,263,779.
Patented Apr. 23, 1918.
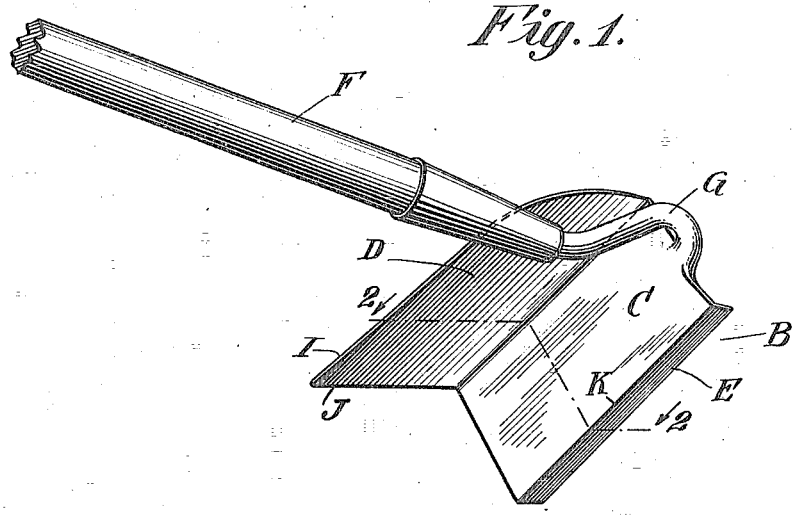
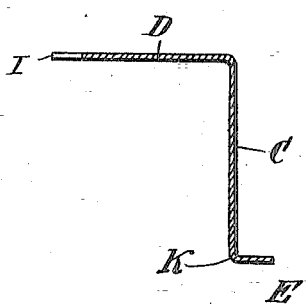
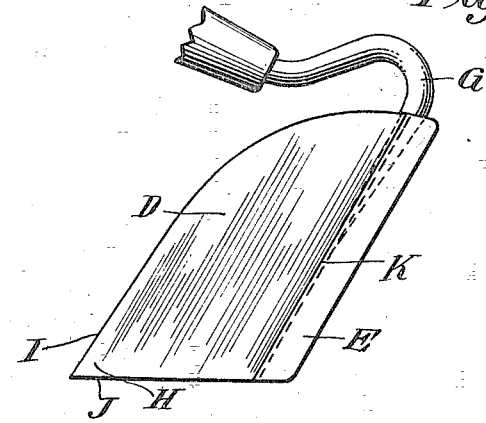
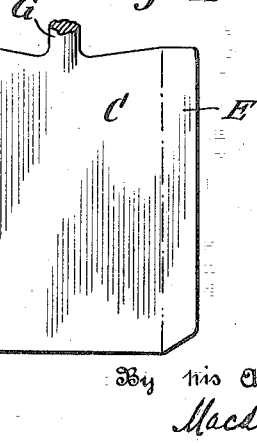
Inventor
John Lentz
By his Attorneys
Macdonald & Macdonald

UNITED STATES PATENT OFFICE.

JOHN LENTZ, OF RIDGEWOOD, NEW JERSEY.

GRASS-EDGING TOOL.

1,263,779.  Specification of Letters Patent.  Patented Apr. 23, 1918.

Application filed August 23, 1917. Serial No. 187,871.

*To all whom it may concern:*

Be it known that I, JOHN LENTZ, a subject of the Duchy of Luxemburg, and a declarant of his intention to become a citizen of the United States, residing at Ridgewood, in the county of Bergen, State of New Jersey, have invented certain new and useful Improvements in Grass-Edging Tools, of which the following is a specification, such as will enable others skilled in the art to which it appertains to make and use the same.

This invention relates to that class of tool used by gardeners and others for the purpose of keeping grass lawns, and grass plots, along their edges, in neatly-trimmed condition.

One of the objects of my invention is to produce an edging tool of the class described, which, in addition to the use just stated, is particularly useful in keeping grass alongside of sidewalks, or in other similar positions, cut away from the edge of such walks, and to prevent the grass from growing, in irregular appearance, over the edges thereof.

Another object of my invention is to provide such a tool which will provide a narrow and shallow horizontal furrow, along the edges of such walks, of uniform width, and avoid any irregularity of the edge of the lawn along the walk.

Another object of my invention is to provide a tool which will cut the sod along the walk and hoe up the loose sod so cut at one and the same operation.

Another object of my invention is to provide a tool which is especially adapted for use along the edges of sidewalks of concrete or stone construction having at one side of the tool a slightly rounded edge and backwardly turned portion, which is adapted to glide readily over any cracks, protuberances or uneven surfaces at the sides of such walks.

Other objects, such as durability and economy of manufacture, will be apparent from the following description, taken in connection with the accompanying drawings, in which,—

Figure 1 is a perspective view of the device, looking from the right hand side toward the inside thereof;

Fig. 2 is a section on line 2—2 of Fig. 1;

Fig. 3 is a side elevation of the device; and

Fig. 4 is a plan view of a blank from which the tool may be manufactured.

Referring to the drawings in detail, B represents the tool in its entirety, being comprised of a back hoe member C, forwardly projecting side member D, and, preferably, the tool will have what may be termed, a fender member E, the device being equipped, by any suitable connection thereto, with an elongated handle F, joined preferably as at G, to the top of the hoe member C.

The back member C constitutes, in effect, a narrow hoe, approximately vertical relative to the handle F, and having its lower edge slightly sharpened as usual, which member will ordinarily be from 1½ to 2 inches in width, and approximately 3 inches, or thereabouts, in height, although the size may be varied. The side member D projects forwardly substantially at right-angles to the back member C, and at the lower portion thereof is preferably provided with a pointed extension thereof, as more clearly indicated at H in Figs. 3 and 4. The side member D from the point of the extension H is provided with sharp cutting edges indicated at I and J. The fender member E is also preferably formed at right-angles to the back member C, but projecting rearwardly therefrom, having a slightly rounded edge, indicated at K, and as this fender member and rounded edge extend from the top to the bottom of the member C, there will be no sharp edge of the tool to contact with sharp edges or protuberances in a sidewalk adjoining a grass plot or lawn to which the tool may be applied.

The operation of the device will be quite clear from the foregoing description: The operator grasps the tool by the handle F, drawing the same toward him, and as he does so, he slightly depresses the outer end of the handle F, so that the point H, with its cutting edges will be projected into and cut through the sod intended to be removed, in this operation, the fender member E contacting with the sidewalk or other such object, lightly slipping over any imperfections in the edge thereof, and the back member C at the same time digging up the sod which has been cut and loosened by the cutting member D. By the operation of this device, in the manner stated, a narrow, shallow, horizontal groove of uniform width and depth may be cut in the grass or sod alongside the sidewalk, and as the fender member E may be held, in operation, more or less closely against the sidewalk, it acts as a guide for readily cutting a groove of uniform dimensions.

It will be evident that when the outer end of the handle F is depressed, the cutting point of the extension H will be thrust into the sod, and may be pulled therethrough with great ease of operation. It will be further apparent that the tool may be used without bringing into play the cutting point of the extension H, by merely slightly raising the outer end of the handle F, when the tool may be used as a hoe of narrow width, to keep free from weeds or grass a groove which may have been cut by the tool in previous operations.

While I have stated that my tool is especially adapted for use in cutting borders along sidewalks, and the like, it will be readily apparent that it is by no means limited to such use, as it will be highly useful in connection with any grass borders for keeping the same in neat, uniform appearance, since it provides a uniform line marker, and the results desired and accomplished by the operation of the tool are always clearly within view of the operator.

I desire it to be understood that I do not wish to confine myself to the precise details of construction and arrangement of the invention as herein set forth, as modification and variation may be made without departing from the spirit of the invention as defined by the appended claims.

What I claim is:

1. In a tool of the class described, the combination with a handle of an approximately vertical blade attached thereto, and an approximately vertically disposed plate connected to and extending from one vertical edge of said blade forwardly at a right-angle to said blade and provided with a sharp-cutting edge.

2. In a tool of the class described, the combination with a handle of a rear upwardly projecting hoe member, and a plate extending forwardly at a right-angle to said hoe member and provided with a sharp cutting edge, and a fender member projecting from said hoe member rearwardly.

3. In a tool of the class described, the combination with a handle of an approximately vertical blade attached thereto, and an approximately vertically disposed cutting member extending from one of the vertical edges of said blade forwardly at a right-angle to said blade, on a line parallel with said handle.

4. In a tool of the class described, the combination with a handle of an approximately vertical blade attached thereto, and a cutting member extending forwardly at a right-angle to said blade, on a line parallel with said handle, but spaced therefrom.

5. In a tool of the class described, the combination with a handle of a rear upwardly projecting hoe member, a cutting member extending forwardly at a right-angle to said hoe member, on a line parallel with said handle, and a fender member projecting from said hoe member rearwardly at a right-angle thereto.

6. In a tool of the class described, the combination with a handle of an approximately vertical blade attached thereto, and a member also approximately vertically disposed, extending from one of the vertically disposed edges of said blade forwardly in the direction of said handle at a right-angle to said blade on a line parallel with said handle, said forwardly extending member being provided with a cutting edge.

7. In a tool of the class described, the combination with a handle of a rear upwardly projecting hoe member, a member extending forwardly at a right-angle to said hoe member on a line parallel with said handle, said forwardly extending member being provided with a cutting edge and a fender member projecting rearwardly from said hoe member.

8. In a tool of the class described, the combination with a handle of a rear approximately vertical hoe member, and an approximately vertically disposed member extending from one of the vertical edges of said blade forwardly at a right-angle to the hoe member, said last named member having a forward edge and a lower edge meeting to form a cutting blade.

9. In a tool of the class described, the combination with a handle of a rear hoe member, a member extending forwardly at a right-angle to the hoe member, said last named member having a forward edge and a lower edge meeting to form a cutting blade, and a fender member projecting rearwardly from said hoe member.

10. In a tool of the class described, the combination with a handle of a rear approximately vertical hoe member, and a member projecting at a right-angle to the hoe member forwardly for the greater portion of its length, the remainder thereof, at its lower edge, forming an obtuse angle with the plane of the hoe member, and an acute angle with the forward edge of said forwardly projecting member.

11. In a tool of the class described, the combination with a handle of a rear hoe member, a member projecting at a right-angle to the hoe member forwardly for the greater portion of its length, the remainder thereof, at its lower edge, forming an obtuse angle with the plane of the hoe member, and an acute angle with the forward edge of said forwardly projecting member, and a fender member projecting rearwardly from said hoe member.

12. In a tool of the class described, the combination with a handle of a rear approximately vertical hoe member, and a member projecting forwardly at a right-angle to the hoe member and having a portion which, at its lower edge, forms an obtuse angle with the plane of the hoe member, and an acute angle with the forward edge of said member, said edges being sharpened to form a cutting point.

13. In a tool of the class described, the combination with a handle of a rear approximately vertical hoe member, and a member projecting forwardly at a right-angle to the hoe member and having a portion which, at its lower edge, forms an obtuse angle with the plane of the hoe member, and meeting the forward edge of said forwardly projecting member to form a pointed cutting blade.

14. In a tool of the class described, the combination with a handle of a rear hoe member, a member projecting forwardly at a right-angle to the hoe member and having a portion which, at its lower edge, forms an obtuse angle with the plane of the hoe member, and meeting the forward edge of said forwardly projecting member to form a cutting blade, and a fender member projecting rearwardly from said hoe member.

JOHN LENTZ.